United States Patent [19]

McNally et al.

[11] Patent Number: 5,710,108

[45] Date of Patent: Jan. 20, 1998

[54] BIOPOLYMER/OIL SUSPENSION COMPOSITIONS UTILIZED IN AQUEOUS-BASED FLUIDS USED IN THE OIL SERVICE INDUSTRY INCLUDING COMPLETION AND DRILLING FLUIDS

[75] Inventors: Keith McNally, Bedminster, N.J.; James Gambino, Yardley, Pa.; Charles Cody, Robbinsville, N.J.; Wilbur Mardis, Southampton, Pa.

[73] Assignee: Rheox, Inc., Hightstown, N.J.

[21] Appl. No.: 628,368

[22] Filed: Apr. 5, 1996

[51] Int. Cl.$^6$ ........................................ C09K 7/02

[52] U.S. Cl. .......... 507/110; 507/111; 507/112; 507/113; 507/114; 507/115; 507/116; 507/119; 507/120; 507/129; 507/138; 507/209; 507/210; 507/211; 507/212; 507/213; 507/214; 507/215; 507/216; 507/217; 507/218; 507/224; 507/225; 507/265; 507/925

[58] Field of Search ........................ 507/110, 111, 507/112, 113, 114, 115, 116, 119, 120, 129, 138, 925, 209, 210, 211, 212, 213, 214, 215, 216, 217, 218, 224, 225, 265

[56] References Cited

U.S. PATENT DOCUMENTS

| | | | |
|---|---|---|---|
| 3,937,678 | 2/1976 | Yasuda et al. | 260/28.5 R |
| 4,128,436 | 12/1978 | OHara et al. | 106/243 |
| 4,502,963 | 3/1985 | Harmon | 507/120 |
| 4,659,486 | 4/1987 | Harmon | 507/120 |
| 5,340,390 | 8/1994 | Magauran et al. | 106/244 |

*Primary Examiner*—Philip Tucker
*Attorney, Agent, or Firm*—Michael J. Cronin

[57] ABSTRACT

The invention involves biopolymer/oil suspension compositions for the oil service industry, most particularly drilling and completion fluids, which provide such fluids a variety of desirable properties. Biopolymers include water soluble polymers and water swellable polymers. Such biopolymer/oil suspension compositions are essentially mixtures of biopolymers such as cellulosics in an oil medium with a specific anti-settling additive. The invention is particularly directed to providing enhanced anti-settling properties to such biopolymer/oil compositions; that is, the ability of the biopolymer/oil composition to retain the biopolymers in suspension prior to the composition being introduced into drilling and completion fluids. The invention in one embodiment is described as a liquid biopolymer-in-oil additive compositions for use in aqueous-based completion fluids, containing an agent comprising: a) one or more polyamides, and b) hydrogenated caster oils including castorwax.

12 Claims, No Drawings

BIOPOLYMER/OIL SUSPENSION COMPOSITIONS UTILIZED IN AQUEOUS-BASED FLUIDS USED IN THE OIL SERVICE INDUSTRY INCLUDING COMPLETION AND DRILLING FLUIDS

BACKGROUND OF THE INVENTION

1. Field of the Invention

The present invention relates to improved biopolymer/oil suspension compositions for aqueous-based fluids used in the oil service industry including drilling and completion fluids. The invention specifically includes biopolymer/oil suspension compositions for such fluids which provide these fluids with a variety of desirable properties. Such compositions are mixtures of water soluble biopolymers in a hydrocarbon oil with a specific anti-settling additive. The invention herein is particularly directed to providing enhanced anti-settling properties to such biopolymer/oil compositions; that is, the ability of the biopolymer/oil composition to retain the biopolymers in a stable suspension prior to the composition being introduced into drilling and completion fluids.

2. Description of the Prior Art

In General

Since the beginning of United States drilling operations in Pennsylvania, Texas and Oklahoma, the oil industry has used drilling fluids, i.e. "drilling muds", as part of the oil well drilling process. In operation, "mud" is pumped under pressure down through a string of drill pipes, through the center of the drilling bit, then back up through the space or annulus between the outside of the drill stem and the borehole wall to the surface.

After a well has been drilled and oil discovered, one or more subterranean, hydrocarbon-producing formations are most often encountered. It is then required to complete the well so as to obtain the maximum hydrocarbon production from the subterranean producing formations.

Completion of a well refers to those operations performed during the period from drilling-in the pay zone, until the time the well is put In production. These operations may include additional drilling-in, placement of downhole hardware, perforation, sand control operations, such as gravel packing, and cleaning out downhole debris. A completion fluid is often defined as a wellbore fluid used to facilitate such operations. Its prime function is to control the pressure of the formation fluid by virtue of its specific gravity. Other properties, such as viscosity, will be dictated by the type of operation performed, the bottom hole conditions and the nature of the formation. Well completion involves the use of completion fluids, which also cleans out the drilled bore hole.

A completion fluid, like a drilling fluid, must accomplish at least two interrelated functions for it to satisfy the minimum requirements for commercial fluids. These functions can be grouped in importance as follows:

(1) The fluid must transport substances such as water soluble polymers, discussed hereafter, and (2) the fluid must also suspend and transport solid particles and a variety of unwanted materials such as bore-hole cuttings and barytes.

Aqueous-based fluids are those comprised of water, water/brines and/or emulsions of oil and water in varying proportions along with other components. The invention hereof relates to biopolymer/oil suspension compositions to be incorporated into such aqueous-based fluid systems for oil drilling operations.

The art describes numerous types of aqueous-based drilling and completion fluids with various components. Important components of these fluids include a variety of salt brines, to "pacify" shale in the producing region, and water soluble biopolymers.

One of the principal problems facing drilling and completion fluid chemistry scientists and technicians is the production of fluids having satisfactory effectiveness and dispersibility. The composition of such fluids and their additives has over the years involved the attention of both scientists and artisans, with numerous improvements made and patented. While the compositions of these various fluids and their additives are considered a "black art" to many, in reality, fluids and their additives involve highly complex chemical, physical and theological analysis using state-of-the art scientific apparatus and intricate mathematical calculations and modeling.

Biopolymer/oil Compositions

Water soluble polymers including biopolymers such as cellulose ethers and guar gum have long been used as an important component of aqueous completion fluids—see, for example, U.S. Pat. Nos. 4,559,149 and 4,610,795. In fact, an important factor in making most completion fluids in particular is to conveniently incorporate water soluble polymeric components therein. Such water soluble polymers are well known in the art. These polymers in the past were normally introduced into a completion fluid, for example, in their solid state and were in general of a particle size with a diameter in the range of 1 to 1000 microns. Such water soluble polymers (in this application referred to as biopolymers for convenience) are normally selected from the group consisting of the cellulose ethers, starches, gums, vinyl polymers, acrylic polymers, and biopolysaccharides.

Examples of specific suitable cellulose ethers for drilling and completion fluids include carboxymethylcellulose (CEC), methylcellulose, carboxymethylhydroxyethylcellulose, hydroxypropylmethylcellulose, hydroxypropylcellulose, hydroxyethylcellulose (HEC), ethylhydroxycellulose, and the like.

Examples of useful gums include arabic, agar, algin, trajacanth, karaya, shatti, locust bean, guar, psyllium seed, quince seed, carrageenin, furcellaran, pectin, gelatin, and larch gum.

Examples of starches and polysaccharides for oil well fluids include carboxymethyl starch, hydroxyethyl starch, and hydroxypropyl starch.

Examples of acrylic polymers useful in oil well fluids include polyacrylamide, polyacrylic acid, acrylamide-acrylic acid, acrylamidemethacylic acid and acrylonitrile.

Examples of vinyl polymers include polyvinylpyrrolidone, polyvinyl alcohol (PVA), and carboxyvinyl polymers.

The more important commercial water soluble polymers used today in completion fluids (as well as in some drilling fluids) include HEC, CEC, PVA, guar gum, xanthan gum, and polysaccharides. See for example U.S. Pat. No. 4,610,795 which provides an exhaustive list of such polymers used in completion fluids. U.S. Pat. No. 3,785,437 issued to Phillips Petroleum, describes the use of a wide variety of these polymeric materials, including cellulose ethers, polysaccharides and polyacrylates which are used in oil field fluids to modify the fluid permeability of hydrocarbon—containing subterranean formations. In the '437 patent, the polymeric materials are described as crosslinking or gelling in situ on the borehole surfaces, reducing their porosity and permeability to water. See also U.S. Pat. No. 5,091,448 to Phillips Petroleum which lists a wide variety of water soluble polymers used in the "oil patch" in drilling fluids.

U.S. Pat. No. 4,846,981 discloses that biological polymeric materials or "biopolymers" most often commercially used in oil well boring applications are homopolysaccharides, xannthan gum heteropolysaccharides and adducts of these materials, which may be used alone or in combination. The polymers described are used in molecular weights ranging from about 500,000 to about 10,000,000 or more. Xanthan gum and polysaccharides as a class are described as typical water soluble polymers of the biopolymer type useful for drilling fluids.

Synthetic polymers include polyacrylamide, polymers containing acrylamide monomer, such as acrylamide-vinyl sulfonic acid copolymers and adducts thereof such as partially hydrolyzed acrylamide or alkoxylated acrylamide. For purposes of this invention, all such polymers are referred to as biopolymers.

Most biopolymers by themselves are by their chemical nature in dry solid or powder form at ambient temperatures. Completion fluids, for example, are usually prepared on site depending for their formulation on actual conditions encountered at the bore hole. Biopolymers in practice are therefore often shipped in containers to these sites (which are most often in the remote areas where oil is typically found). One of the problems experienced in the field when mixing dry or powdered biopolymers into fresh water or brine drilling fluid systems at the oil well drilling location, often due to inadequate mixing equipment, is the formation of globules of unhydrated dry polymer in the completion fluid, often referred to as "lumps" or "fish-eyes." Such lumping varies from minimum to severe, depending upon the acidity of the water or brine and other factors, including temperature of incorporation, the time of dispersion and the strength of the shear or mixing force used in incorporation. When "fish-eyes" are formed, pieces of unhydrated biopolymer of varying sizes and textures represent biopolymer that will not be available to serve in the process for which they are used in the aqueous fluid, thus reducing their productivity and increasing costs to the drilling customer. For this reason, many biopolymers which are used in completion fluids have been first incorporated into a liquid pourable oil suspension either on site or remotely, with the biopolymer-oil suspension composition being in a liquid form at the temperatures encountered in drilling operations.

In one typical prior art field application, water soluble polymers in an oil composition are shipped to the site in a fluid state and there mixed into an aqueous-based completion fluid using already available rig on-site mixing equipment. In another application, a biopolymer powder formulation is delivered to the vicinity of the well for dispersion in an oil medium to form a suspension composition, on site, prior to incorporation into a drilling fluid—such a dispersion capability permits the driller to produce the needed biopolymer/oil suspension composition on-demand thus eliminating long term storage.

Commercial liquid biopolymer/oil suspension compositions for well boring operations in a pourable form are available in the marketplace. A leading family of commercial products are a line of polymers using hydroxyethyl cellulose sold by Drilling Specialities Company, Houston, Tex.; a representative product is a high viscosity hydroxyethylcellulose polymer dispersed in a mineral oil.

Another line of biopolymer products are available under the trademark Hydrovis—L™. Hydrovis—L™ is a dispersion of hydroxyethylcellulose polymer (HEC) in an organic solvent. The product contains around 40% HEC by weight and appears to utilize a process of incorporating the dry biopolymer into an organic solvent using proprietary shearing techniques which "encourage" the biopolymer solids to remain in suspension without settling into a heavy mass for at least a limited period of time.

Many oil/biopolymer dispersions available on the market have as a major disadvantage in that there is a tendency for the biopolymers, over short periods of time, to settle and pack down (or "hard pack") into the bottom portion of the container, making it difficult for field personnel to pour the dispersion into the oil well fluid. For this reason, some of such biopolymer/oil liquid compositions for aqueous drilling and completion fluids incorporate organoclays, a reaction product of smectite-type clay and quaternary ammonium compounds, as an anti-settling agent to retain the water soluble polymers in suspension. In these biopolymer/oil suspension compositions, organoclays provide settling and syneresis control; however they may cause plugging in the bore hole of the drilling fluid formulation when added thereto, depending on the type of geological formation.

The previously mentioned U.S. Pat. No. 5,091,448 describes a liquid suspension of water soluble polymers comprising such polymers and at least one iso-paraffinic oil medium, one styrene/isoprene copolymer and hydrophobic fumed silica with the addition of an organoclay as an optional ingredient.

In addition, the use of organoclays, which are hydrophobic and compatible with oil, at a loading of only 1%, can cause the oil/biopolymer suspension compositions to begin to gel and thicken and rapidly lose liquidity. This alone has created a search for a reasonably priced biopolymer/oil suspension composition containing an antisettling agent other than organoclay that will provide effective suspension and syneresis control without gelling.

It will be worthwhile to discuss some particular prior art references in other fields. U.S. Pat. No. 3,937,678 discloses a process for improving suspension properties of a nonaqueous fluid system containing finely divided solid particles. The process involves a mixture of an amide wax obtained from the reaction of hydrogenated castor oil fatty acid or an organic acid mixture containing at least 30 molar percent of hydrogenated castor oil fatty acid and an amine, and an emulsifiable polyethylene wax of defined characteristics. The patent describes the use of hydrogenated castor oil as an antisagging additive in paints as not effective at normal temperatures and that such castor oil can "seed" above 50° C.

Rheox, Inc., assignee herein has sold a commercial product designated THIXATROL ST as a rheological additive and a anti-settling additive for oil based paints and coatings. THIXATROL ST is chemically described hereafter. U.S. Pat. No. 3,977,894, issued to Rheox, Inc.'s parent corporation, describes a rheological additive for nonaqueous systems comprising a mixture of an organoclay and two solid waxes one of which is a glyeryl tri-12-hydroxystearate wax.

U.S. Pat. No. 4,128,436 discloses a rheological control agent comprising a particulate blend of hydrogenated castor oil, and an oligomeric polyamide derived from hydroxystearic acid, one or more saturated aliphatic alpha, omega-diprimary diamines containing 2, 4, 6, 8 or 10 carbon atoms and one or more saturated aliphatic alpha, omega-dicarboxylic acids containing from 2 to 10 carbon atoms and/or hydrogenated dimer acids. The oligomeric acid is described as derived from the reaction of the hydroxystearic acid, dicarboxylic acid and diamine in such proportions that for each mole of hydroxystearic acid there is present 0.05–0.5 moles of dicarboxylic acid and a quantity of diamine sufficient to provide 0.8 to 1.15 amine groups for each carboxyl group in the acid mixture.

The invention herein discloses a novel pourable biopolymer/oil suspension composition for use in aqueous drilling and completion fluids, which are distinguished by improved suspension properties, high ecological acceptability, high temperature effectiveness, and at the same time, excellent storage and application properties. A number of other additives besides biopolymer additives, providing other properties, can be used in the compositions of this invention so as to obtain desired application properties, such as, for example, emulsifiers or emulsifier systems, fluid loss-prevention additives, and wetting additives.

Important areas of application for these new biopolymer/oil suspension compositions are in drilling and completion fluids in both on- and off-shore wells for the development of hydrocarbon deposits, the aim of the invention being particularly to make available industrially practical usable completion fluids with enhanced properties. The new composition can also be put to use in drilling operations other than hydrocarbons, for example, in geothermal wells and geoscientific bores.

SUMMARY AND OBJECT OF THE INVENTION

The present invention overcomes the problems and disadvantages of the prior art by providing an effective biopolymer/oil suspension composition for oil well fluids including drilling fluids, stimulation fluids and completion fluids. Another important object of the invention is to improve the anti-settling properties of liquid biopolymer/oil compositions for such fluids. It is yet another object of the invention to provide stable suspensions of biopolymers in oil compositions that do not exhibit excessive syneresis and "hard settling" during storage or transport to the oil well drilling location.

It is a further object of the invention to provide a completion fluid that has satisfactory properties for containing various particles, including water soluble polymeric biopolymers, bore-hole cuttings and weighting materials, that is convenient to make and use.

Additional objects and advantages of the invention will be set forth in part in the description which follows, and in part will be obvious from the description, or may be learned by practice of the invention. The objects and advantages of the invention will be realized and attained by means of the instrumentalities and combinations particularly pointed out in the appended claims.

DESCRIPTION OF THE PREFERRED EMBODIMENTS

The invention herein in can be described as a liquid biopolymer/oil suspension composition for use in fluids used in the oil service industry comprising:
a) one or more hydrocarbon oils;
b) one or more biopolymers; and
c) an anti-settling agent comprising
  i) one or more polyamides, and
  ii) hydrogenated castor oil.

The above two anti-settling agent components can be mixed in a large range of proportions one to the other, with an excess of hydrogenated castor oil being preferred. Ranges of about one part by weight of component i) to two parts by weight of component ii) are particularly preferred. It is preferred that a powder or powder-like form of both components be utilized. The two elements can also be used with starting material containing additional ingredients. A wide variety of powder particle sizes is effective. The agent can be prepared using standard commercial mixing apparatus available at most fully-equipped chemical manufacturing facilities.

The invention includes biopolymer/oil suspension compositions incorporating such anti-settling agents. It is to be understood that such suspension compositions can contain additional additives. In a preferred embodiment the polyamides used are selected to be these polyamides which are essentially non-reactive. As used herein, the term "nonreactive polyamide" includes any of the products of the reactions (1)–(4) set forth below wherein the average number of amide linkages is two or more. The nonreactive polyamide is inert from a potentially reactive standpoint, in that it contains no appreciable level of active hydrogen-containing species. Such polyamides are therefore chemically non-reactive when incorporated into a system.

The polyamide component a) of the instant invention can be prepared by the following reactions designated, Reaction 1 to 4, as well as by other well-known, polyamide-producing reactions.

Reaction (1).
Reacting at least one polycarboxylic acid of the formula $$(A)[COOH]_x \quad (I)$$

wherein $x \geq 2$ and A is selected from the group consisting of aliphatic, aromatic, cycloaliphatic and arylaliphatic groups with at least one monoamine of the formula $$(G)NH \quad (II)$$

wherein G is selected from the group consisting of aliphatic, aromatic, cycloaliphatic and arylaliphatic groups, and wherein the monoamine may include primary amines and/or secondary amines, and when the monoamine contains a primary amine, the additional hydrogen atom is included in the (G) moiety, to form a polyamide of the formula $$(G)NOC(A)CON(G) \quad (a)$$

Reaction (2):
reacting at least one polycarboxylic acid of the formula (I) with at least one monoamine of the formula (II), and at least one polyamine of the formula $$(D)[NH]_y \quad (III)$$

wherein $y \geq 2$ and D is selected from the group consisting of aliphatic, aromatic, cycloaliphatic and arylaliphatic groups, and wherein the polyamine may include primary amines and/or secondary amines, and when the polyamine contains a primary amine, the additional hydrogen atom is included in the (D) moiety, to form a polyamide of the formula $$(G)NOC(A)CO[N(D)NOC(A)CO]_nN(G) \quad (b)$$

wherein $n=1$ to $\infty$.

Reaction (3):
reacting at least one polyamine of the formula (III) with at least one monocarboxylic acid of the formula $$(E)COOH \quad (IV)$$

wherein $y \geq 2$ and E is selected from the group consisting of aliphatic, aromatic, cycloaliphatic and arylaliphatic groups to form a polyamide of the formula $$(E)CON(D)NOC(E) \quad (c)$$

Reaction (4):
reacting at least one polycarboxylic acid of the formula (I) with at least one polyamine of the formula (III) and, at least one monocarboxylic acid of the formula (IV), to form a polyamide of the formula (E)CON(D)N[OC(A)CON(D)N]nOC(E)    (d)

wherein n=1 to ∞.

The polyamide of this aspect of the invention may also be prepared by reacting, to form mixtures, of any of the reaction products formed from any of above Reactions 1 to 4.

The formulas of polycarboxylic acids and polyamines set forth above include those with a functionality of two, i.e. x=2, y=2, for illustrative convenience. Polycarboxylic acids and polyamines with a functionality of three or greater may also be employed.

The above reactions may or may not be carried out in the presence of a catalyst.

As used herein, the term "polycarboxylic acid" includes all aliphatic or aromatic carboxylic acids having a carboxylic acid functionality of two or more. As used herein, the term "monocarboxylic acid" includes all aliphatic or aromatic carboxylic acids having a carboxylic acid functionality of one, as well as corresponding monofunctional acid anhydrides, esters and acid halides. As used herein, the term "monoamine" includes aliphatic or aromatic primary or secondary amines having an amine functionality of one.

The molar quantities of the reactants of reactions (1) through (4) are whole numbers with the exception that the moles of monocarboxylic acid of the formula (IV), or the moles of monoamine of the formula (II), may be a fractional quantity if the average functionality of the polyamine and/or polyacid containing backbone is fractional, since the moles of capping agent is equal to the functionality of the backbone.

In reaction (1), at least 2.0 moles of monoamine are employed for each mole of polycarboxylic acid. The moles of monoamine equal the average functionality of the polycarboxylic acid.

In reaction (2), at least 2.0 moles of monoamine are employed. The moles of monamine equal the average functionality of acid-terminated polyamide from the reaction of the polycarboxylic acid and the polyamine. At least 2.0 moles of polycarboxylic acid are employed, and the moles of polycarboxylic acid employed are the same as or greater than the moles of polyamine employed. The equivalents of polycarboxylic acid are greater than or equal to the equivalents of polyamine plus 2.0. The equivalents of polycarboxylic acid minus the equivalents of polyamine equal the equivalents of monoamine.

In reaction (3), at least 2.0 moles of monocarboxylic acid are employed. The moles of monocarboxylic acid are equal to the average functionality of the polyamine. 1.0 moles of polyamine is employed.

In reaction (4), at least 2.0 moles of monocarboxylic acid are employed. The moles of monocarboxylic acid employed are equal to the average functionality of the amine-terminated polyamide from the reaction of the polyamine and the polycarboxylic acid. At least 2.0 moles of polyamine are employed. The moles of polyamine employed are greater than or equal to the moles of polycarboxylic acid employed. The equivalents of polyamine minus the equivalents of polycarboxylic acid equal the equivalents of monocarboxylic acid.

Exemplary suitable polycarboxylic acids for use in preparing the nonreactive polyamide component of the invention include dimerized and trimerized fatty acids. As used herein the term "dimerized fatty acids" includes any acid obtained by dimerizing saturated, ethylenically unsaturated or acetylenically unsaturated naturally occurring or synthetic monobasic aliphatic carboxylic acids containing from 8 to 24 carbon atoms—18 carbon atoms being most common.

As used herein, the term "trimerized fatty acid" includes any acid obtained by trimerizing saturated, ethylenically unsaturated or acetylenically unsaturated naturally occurring or synthetic monobasic aliphatic carboxylic acids containing from 8 to 24 carbon atoms.

Additional exemplary suitable polycarboxylic acids, include glutaric acid, malonic acid, adipic acid, succinic acid, suberic acid, sebacic acid, azelaic acid, dodecanedioic acid, pimelic acid, terephtahalic acid, isophthalic acid, phthalic acid, naphthalene dicarboxylic acids and 1,4- or 1,3-cyclohexane dicarboxylic acids.

In general, any polycarboxylic acid in which the carboxylic acid groups are separated by a bivalent hydrocarbon group which may be saturated or unsaturated, aliphatic, aromatic or cycloaliphatic or which may have two or more aliphatic, aromatic or cycloaliphatic moieties, can be used to form the polyamides employed in the invention.

Exemplary suitable polyamine compounds for use in this aspect of the invention include ethylene diamine, 1,2-diaminopropane, 1,3-diaminopropane, p-xylene diamine, 1,6-hexamethylene diamine, 2-methylpentamethylene diamine, 4,4'-methylenebis(cyclohexylamine), polyglycol diamines, isophorone diamine, 1,4-diaminocyclohexane, cyclohexanebis(methylamine), bis[1,4-(2'-aminoethyl)]benzene, 10-aminoethyl-stearylamine, 1,3 -di-4-piperidyl propane, 1,12-diaminododecane, piperazine, bis[3-aminopropyl]piperazine, polyethylene polyamines such as diethylene triamine and triethylene tetramine, diethyltoluene diamine and bis[aminoethyl]diphenyl oxide. Polymeric fat polyamines and ether polyamines may also be used. These polyamines are described for example in U.S. Pat. No. 4,018,744 and U.S. Pat. No. 3,010,782.

Exemplary suitable monocarboxylic acids for use in the invention include fatty acids. The term "fatty acids" as used herein includes saturated, ethylenically unsaturated and acetylenically unsaturated naturally occurring and synthetic monobasic aliphatic acids containing from 8 to 24 carbon atoms.

Exemplary suitable monoamines for use in the invention include methylamine, dimethylamine, ethylamine, diethylamine, n-propylamine, di-n-propylamine, n-butylamine isobutylamine, sec-butylamine, tert-butylamine, di-n-butylamine, monoamylamine, diamylamine, ethylbutylamine, n-hexylamine, cyclohexylamine, benzylamine, alpha-phenylethylamine, beta-phenylethylamine, aniline, methylaniline, o-toluidine, m-toluidine, p-toluiding, o-anisidine, m-anisidine, p-anisidine, dodecylamine, cocoamine, hexadecylamine, octadecylamine, oleylamine, dicocoamine, and di(hydrogenated-tallow)amine.

Exemplary suitable catalysts for use in the invention include acid compounds such as phosphoric acid, oxides or carbonates of an alkaline nature such as magnesium oxide or calcium oxide and halogen salts of polyvalent metals and acids.

The ratio of equivalents of amine to acid groups for the above polyamide syntheses is preferably from about 0.8:1.0 to about 1.2:1.0 equivalents of amine to acid (NH/COOH), more preferably from about 0.95:1.00 to about 1.05:1.00 equivalents NH/COOH, most preferably about 1.0:1.0 equivalents NH/COOH. As used herein "amine" or "NH" means any primary or secondary amine group. As used herein, "acid" or "COOH" represents any carboxylic acid, ester, acid halide or anhydride group.

Particularly preferred as a polyamide of the above type for this invention is an monoamine capped non-reactive polyamide of the type described in U.S. Pat. No. 5,180,802 issued to assignee herein. Most particularly preferred as such a polyamide is a product sold by Rheox, Inc. under the trademark THIXATROL NR 22.

Other polyamides, which are not nonreactive polyamides of the above type, have also been found useful as a component of the anti-settling agent to make the biopolymer/oil suspension compositions of this invention, including polyamides selected from the group consisting of:

$$R_1-NHCH_2CH_2NH-R_1,$$

where $R_1$ is independently selected from the group consisting of the acyl radicals of 12-hydroxystearic acid and decanoic acid with the acyl radical defined as a $R_2-C(=O)$-moiety, where the $R_2-C$ length and structure is defined by the conjugate acid of the acyl radical.

Commercial products available of this type include Craylac Super, a product of Cray Valley Inc. and THIXATROL PLUS, a product of Rheox, Inc.

Also useful are polyamides selected from the group consisting of:

$$R_3-NH(CH_2)_6NH-(R'-NH(CH_2)_6NH)_m-R_3,$$

where $R_3$ is independently selected from the group consisting of the acyl radicals of $C_{16}-C_{18}$ fatty acids and the acyl radical of ricinoleic acid, R' is the diacyl radical of the $C_{18}$ unsaturated fatty acid dimers; m is 1–17, preferably 1–12, and most preferably 1–5.

A commercial product available from Rheox of this type bears the commercial designation THIXATROL SR 100.

Another product found useful in preparing the compositions of this invention is Rheox commercial product THIXATROL ST. This product is a mixture of castor wax and an amine reaction product made by reacting ethylenediamine with 12-hydroxystearic acid in a range of 3 to 1. The ethylenediamine component has the formula:

$$CH_3(CH_2)_5CH(OH)(CH_2)_{10}C(=O)NHCH_2CH_2NHC(=O)(CH_2)_{10}CH(OH)(CH_2)_5CH_3$$

The castor oil component, component (b), of the inventive composition is hydrogenated castor oil, often referred to as castor wax.

It has been known for some time that castor products derived from the castor bean plant and oil obtained from the bean can be formed into a large variety of derivatives; one such example is castor wax. The molecular structure of castor oil permits the creation of a large number of new chemical products by innumerable and various reactions. Many of these derivatives, in combination with extenders, have been found to function as excellent rheological additives, particularly in aliphatic, enamel and alkyl paint systems.

The molecular structure of natural castor oil is a triglyceride with three pendant carbon chains. Generally, each carbon has a double bond at the 9,10 position and a hydroxyl group on the 12th carbon. Castor oil, like most natural oils, is a chemical whose constitution requires a statistical analysis to describe. Castor oil in nature has a hydroxyl value of approximately 160–165 with a fatty acid distribution of approximately 89% $C_{18}OH$ and 9–12% $C_{18}$; that is, not all the carbon chain lengths in natural or untreated castor oil contain an OH group; only about 88–90% of said chains on average do so.

The molecular structure of the three pendant carbon chains making up castor oil are shown in the following diagram:

MOLECULAR STRUCTURE OF CASTOR OIL

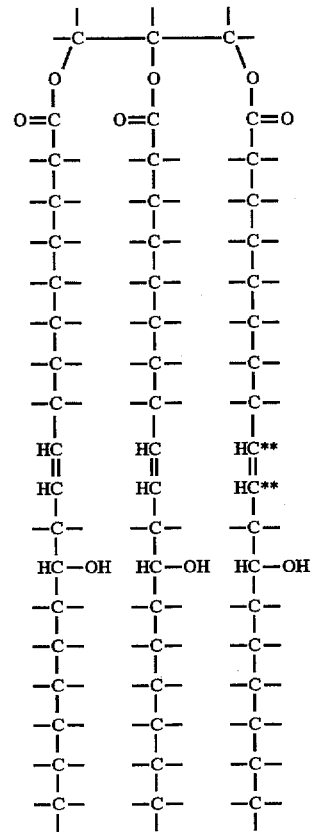

where approximately 2% of the pendant chains are a $C_{16}$ chain and 98% a $C_{18}$ chain and 88–90% of the chains chains have OH bound to the carbon in the 12 position (*) and a double bond between carbons in the 9,10 position (**); 9–12% of the total of the chains have H bound to the carbon in the 12 position, but may or may not have a double bond on the carbon atom in the 9,10 position. In the above diagram, hydrogens are not shown in the diagram except at the 9, 10 and 12 position and the predomonate $C_{18}$ chain is the basis of the drawing.

A very useful derivative of castor oil is a hydrogenated product often referred to as castor wax because of its consistency. Castorwax is a synthetic, waxlike compound obtained by the controlled hydrogenation of natural castor oil. The principal constituent, as mentioned above, is the glyceride of 12-hydroxystearic acid. There are also present minor quantities of mixed glycerides of this acid. U.S. Pat. No. 3,252,820 describes a rheological composition containing a thixotropic wax derived from glycerol trihydroxystearate, the hydrogenated form of castor oil. Rheox, Inc. assignee herein, offers for sale a commercial product designated THIXCIN R, which is a castor wax.

Castorwax has a relatively high melting point. It is practically odorless and is easy to handle. It can be obtained commercially most often in the form of uniform, free-flowing, white flakes. When molten it is clear, transparent, very fluid, and largely colorless. Castorwax is "hard" in comparison with most other waxes.

In addition to fully hydrogenated or regular castorwax, there are also available a series of partially hydrogenated castor waxes of intermediate melting points which are wax-like. These waxes of lower melting point may differ in composition from regular castorwax by containing lower percentages of glyceryl trihydroxystearate.

As discussed, castor wax is most commonly produced from castor oil by hydrogenation, and can be described as essentially a hydrogenated molecule having no or slight appreciable change in hydroxyl value versus the natural hydroxyl value of castor oil from which it was made. Castor oil has a natural hydroxyl value in the range of 160–165. Both completely and partially hydrogenated castor wax made from both natural hydroxyl level castor wax and lowered hydroxyl value castor wax is useful as the castor component of this invention. See U.S. Pat. No. 5,340,390, issued to assignee herein, which describes lowered hydroxyl value castor waxes.

Hydrocarbon oils used to form the inventive composition can be selected from widely available sources—oils are broadly defined to mean all liquid hydrocarbon oils including natural oils such as vegetable and fatty oils, diesel oil, mineral seal oil, mineral oil, kerosene, crude oil, heating oil, polyalphaolefins and iso-paraffins with diesel oil, mineral seal oil and mineral oil being preferred.

The inventive suspension composition can be used in the drilling and completion of oil wells presently drilled with present-day technology. Such compositions can contain approximately 30–35% water soluble polymer additives or greater.

The inventive suspension composition of the invention can be added to drilling, completion and other oil well fluids and dispersed therein using known techniques. Amounts of the composition used in such fluids can vary over a preferred range of about 0.75% to about 6% with a more preferred amount being greater than 1.0% to around 3%.

It is of some importance that the anti-settling agent be incorporated into a oil/biopolymer mixture involved at an incorporation temperature slightly above ambient temperature in the range of about 80° F. to about 130° F. to achieve maximum effectiveness. The additive can also be prepared in a "preactivated" composition by being first added to a portion of solvent or oil and heated for a period of time to the above referenced temperature range and then dispersed into a fluid, or, more often, cooled to any temperature including temperatures as low as about 0° F. and then thereafter used by addition to a oil/biopolymer mixture. The period of pre-heating to pre-activate the anti-settling additive can be preferrably about 15 minutes. A low toxicity mineral oil is a preferred oil to use for preactivation with a preferred amount of additive to solvent being in a range of about 1 to 5 to about 2 to 1.

The surprising advantages of the biopolymer/oil suspension compositions of the invention are; they are pourable/pumpable, exhibit minimum separation/syneresis and exhibit little or no hard pack settling. An approximate 1:2 blend of polyamide to castor component has been found of particularly benefit. A wide variety of other ratios however will provide equal or only slightly diminished benefit within a range of about 4:1 to 1:6 polyamide to castor component preferred.

Without being bound by theory, it is surmised that the castor component provides initial viscosity build, while the addition of the polyamide component reduces syneresis and provides heat stability. A minimum temperature of around 90° F. is recommended to activate the composition but activation temperatures in a broad range of about 90°–120° F. have been found to provide effective and improved viscosity and syneresis control.

The following examples demonstrate the effectiveness of the invention:

EXAMPLE I

This example used as a control a commercial organoclay anti-settling additive commercially known to be used as an anti-settling agent in liquid pourable biopolymer/oil suspension compositions for completion fluids as a comparative control and involved syneresis comparisons of chemicals representing each individual component of the inventive composition alone. Mineral seal oil (MSO) was used as a representative oil. THIXCIN R is a commercially available standard hydroxyl value castor wax sold by Rheox, Inc. while THIXATROL NR-22 is a commercially available non-reactive polyamide also sold by Rheox, Inc. The results are shown in Table 1.

Hard pack is the settling, in a liquid system, of a compound to the bottom of the sampling container so that the material can not easily be reincorporated into the fluid with gentle stirring. Syneresis is effectively the opposite of hard pack, and is a measurement of that liquid portion of the top of a container where visually it can be seen that settling has reduced the amount of particles in suspension. The smaller the measurement of syneresis the better the anti-settling effort.

TABLE 1

| Additive | Organoclay - BENTONE 38 Commercial Product | THIXCIN R | THIXATROL NR-22 | THIXATROL NR-22 |
| --- | --- | --- | --- | --- |
| Percent | 1.5 | 2.0 | 2.0 | 1.5 |
| Incorporation Temp. F. | 90 | 106 | 114 | 106 |
| Water soluble polymer | HEC | HEC | HEC | HEC |
| SYNERESIS - inchs | | | | |
| 1 WEEK | 1/16 | 1/8 | 1/32 | 1/32 |
| COMMENTS | no hard pack settling | no hard pack settling, thick | no hard pack settling, very thick, not pourable | no hard pack settling, very thick but, pourable |

The above shows that each component of the anti-settling agent used in the novel biopolymer/oil compositions of the present invention provides good anti-settling properties and syneresis control, but compositions using such individual components are viscous and not readily pourable, and that organoclays exhibit better overall performance, i.e. pourability, good syneresis control, then each component of the agents of this invention alone.

EXAMPLE 2

This example compares representative biopolymer/oil suspension compositions made according to this invention, first using as an additive, a mixture of 2 parts hydrogenated castor oil (THIXCIN R) to 1 part polyamide (THIXATROL NR 22), designated agent A, and second, a mixture of 3 parts hydrogenated castor oil and 1 part polyamide using a commercial product of Rheox sold under the tradename THIXATROL ST (previously described), designated agent B, at various incorporation temperatures and compares the results versus a conventional composition using an organoclay additive. Total weight of the additive was 1.5% in each test in the composition. A HEC biopolymer was incorporated into a mineral - seal oil based system with the additives to form the inventive compositions. The results are reported in Table 2.

TABLE 2

Incorporation Temperature Study

| Agent | BENTONE 38 Control Composition | A | A | B | B | B |
|---|---|---|---|---|---|---|
| Percent | 1.5 | 1.5 | 1.5 | 1.5 | 1.5 | 1.5 |
| Incorporation Temperature °F. | 90 | 112 | 86 | 84 | 102 | 121 |
| Brookfield LVT #3, 60 RPM, RT | 1430 | 2000 | 720 | 320 | 1360 | 2000+ |
| SYNERESIS - inchs | | | | | | |
| 1 DAY | >1/32 | <1/32 | 1/4 | 3/8 | 1/32 | <1/32 |
| 1 MONTH | 3/16 | 3/16 | 3/8 | 1/2 | 1/4 | 1/8 |
| % Syneresis 1 Month | 12.8 | 4.4 | 11.6 | 16.8 | 6.8 | 3.6 |
| COMMENTS | No Hard Pack Settling | No Hard Pack Settling, good pourability | Soft-mod settle | Mod pack settle Needs Higher Temperature | Mod-soft pack | Soft settle |

The above data demonstrates that incorporation temperature influences settling, syneresis and viscosity. The compositions using Agent A, heated to 112° F., exhibited similar syneresis control, and viscosity similar to the organoclay control. When activated at 86° F. it provided syneresis substantially similar to the organoclay control. The three tests of compositions using Agent B compare results at different temperatures; as temperature increases, viscosity increases and syneresis was reduced.

EXAMPLE 3

This example demonstrates the effectiveness of the compositions of the instant invention made using a MSO fluid which contained a HEC biopolymer to form an inventive composition with Agent A. The test involved employed the anti-settling agent as a direct additive and in a pre-gel composition. The pregel was a mixture of Agent A in a oil which was then heated to a temperature of around 100° F. for 5 minutes, which caused some degree of gelling. The pregel was then allowed to return to ambient temperature prior to addition into the MSO fluid containing the HEC biopolymer. The results show that pre-activation of the inventive additive is effective.

The results are reported in Table 3.

TABLE 3

| Additive | BENTONE 38 Control Composition | Agent By Itself | Agent in Pregel 20% solids | Agent in Pregel 10% solids | Agent in Pregel 53% solids |
|---|---|---|---|---|---|
| Percent | 1.5 | 1.5 | 7.5 | 15 | 2.8 |
| Incorporation Temperature °F. | 90 | 118 | 107 | 109 | 112 |
| Base Oil | MSO | MSO | MSO | MSO | MSO |
| FANN VISCOSITY @ 77° F. | | | | | |
| 600 RPM | 180 | 215 | 178 | 184 | 212 |
| 300 RPM | 135 | 155 | 27 | 134 | 155 |
| 6 RPM | 50 | 57 | 40 | 48 | 52 |
| 3 RPM | 35 | 54 | 38 | 43 | 47 |
| PV, cPS | 45 | 60 | 51 | 50 | 57 |
| YP, bl/100 Sq. Ft. | 90 | 95 | 76 | 84 | 98 |
| 10 Sec Gel, lb/100 Sq. Ft. | 34 | 42 | 34 | 40 | 41 |
| 10 Min Gel, lb/100 Sq. Ft. | 35 | 42 | 39 | 45 | 41 |
| SYNERESIS - inchs | | | | | |
| 1 DAY | >1/32 | <1/32 | 1/16 | <1/32 | <1/32 |
| 1 WEEK | 1/16 | <1/16 | 1/4 | 1/16 | 1/16 |
| 1 MONTH | 3/16 | 3/32 | 5/16 | 3/32 | 3/16 |
| % Syneresis 1 Month | 12.8 | 7.7 | 19.7 | 8.4 | 10.5 |

TABLE 3-continued

| Additive | BENTONE 38 Control Composition | Agent By Itself | Agent in Pregel 20% solids | Agent in Pregel 10% solids | Agent in Pregel 53% solids |
|---|---|---|---|---|---|
| COMMENTS | No Hard Pack Settling | No Hard Pack Settling | No Hard Pack Settling, Gel easy to use | No Hard Pack Settling, Gel easy to use | No Hard Pack Settling, Gel hard to handle |

EXAMPLE 4

This example shows a number of tests of three different inventive compositions using HEC as a biopolymer in several different oils. LVT 200 is a mineral oil fluid—the anti-settling agent used was Agent A. All results showed an effective anti-settling result. Results are reported in Table 4.

TABLE 4

| Run | Run 1 | Run 2 | Run 3 |
|---|---|---|---|
| Percent of Additive | 1.5 | 1.5 | 1.5 |
| Incorporation Temperature °F. | 118 | 117 | 116 |
| Base Oil | MSO | LVT 200 | Diesel |
| FANN VISCOSITY @ 77° F. | | | |
| 600 RPM | 215 | 171 | 135 |
| 300 RPM | 155 | 135 | 97 |
| 6 RPM | 57 | 57 | 28 |
| 3 RPM | 54 | 54 | 25 |
| PV, cPS | 60 | 36 | 38 |
| YP, b/100 Sq. Ft. | 95 | 99 | 59 |
| 10 Sec Gel, lb/100 Sq. Ft. | 42 | 30 | 21 |
| 10 Min Gel, lb/100 Sq. Ft. | 42 | 30 | 23 |
| SYNERESIS - inchs | | | |
| 1 DAY | <1/32 | 1/16 | 1/4 |
| 1 WEEK | <1/16 | 1/16 | 1/4 |
| 1 MONTH | 3/32 | 1/8 | 1/2 |
| % Syneresis 1 Month | 7.7 | 9.4 | 30.3 |
| COMMENTS | No Hard Pack Settling, good remix | No Hard Pack Settling, good remix | No Hard Pack Settling, Very good remix |

Data in Table 4 compares commercially used base oils for preparation of a liquid oil/biopolymer composition—such compositions are commonly shipped to remote oil well drilling sites where they are incorporated into aqueous drilling and completion fluids. The inventive suspension compositions using both MSO and LVT 200 possess properties which eliminates hard pack settling and provide good syneresis. The diesel oil composition exhibited a high level of syneresis but remix was good—note that the amount of anti-settling agent was not optimized for diesel oil.

EXAMPLE 5

This example directly compares an inventive compositions containing two ingredient agents against each of its individual constituentes with a HEC biopolymer in mineral oil. The inventive composition used a 2:1 mixture of the two individual chemicals tested and preactivation was used.

TABLE 5

| Additive | Inventive Composition | Castor Wax Thixcin R | Thixatrol NR - 22 |
|---|---|---|---|
| Percent | 1.5 | 1.5 | 1.5 |
| Incorporation Temperature °F. | 112 | 116 | 110 |
| FANN VISCOSITY @ 77° F. | | | |
| 600 RPM | 200 | 227 | 175 |
| 300 RPM | 146 | 182 | 125 |
| 6 RPM | 50 | 62 | 37 |
| 3 RPM | 40 | 45 | 32 |
| PV, cPS | 54 | 45 | 50 |
| YP, bl/100 Sq. Ft. | 92 | 137 | 75 |
| 10 Sec Gel, lb/100 Sq. Ft. | 42 | 55 | 29 |
| 10 Min Gel, lb/100 Sq. Ft. | NT | NT | NT |
| SYNERESIS - inchs | | | |
| 1 DAY | <1/32 | 1/16 | <1/32 |
| 1 WEEK | 3/32 | 1/4 | 1/8 |
| 1 MONTH | 3/16 | 5/16 | 3/16 |
| % Syneresis 1 Month | 4.4 | 7.4 | 3.6 |
| COMMENTS | No Hard Pack Settling, good pourability | No Hard Pack Settling, somewhat hard to pour | No Hard Pack Settling, good pourability |

The above results demonstrate that when activated in a preferred range 100°–120° F. the compositions provide effectiveness by offering a good balence of low activation temperature, viscosity, syneresis control and cost.

EXAMPLE 6

This example demonstrates that the inventive composition is effective in a broad range of mixtures of the two materials to form the anti-settling agent. The tests compare a powder mixture at a ratio of 2:1 using THIXCIN R (THIX R) and THIXATROL NR-22, as described in examples 1 and 2, with several pregels utilizing different ratios of the same materials. The pre-gel was prepared by dispersing agents into a base oil (MOI) at 60° C. and a loading of 25% solids. All samples were incorporated into the biopolymer suspension (HEC) beginning at a temperature of 74° F.

TABLE 6

| Anti-Settling Agent | THIX R/N22 2:1 Powder | THIX R/N22 1:1 GEL | THIX R/N22 2:1 GEL | THIX R/N22 3:1 GEL | THIX R/N22 4:1 GEL | THIX R/N22 1:2 GEL |
|---|---|---|---|---|---|---|
| Percent | 1.5 | 6.0 | 6.0 | 6.0 | 6.0 | 6.0 |
| Fann Viscosity @ 77° F. | | | | | | |
| 600 RPM | 101 | 158 | 150 | 137 | 124 | 128 |
| 300 RPM | 60 | 115 | 115 | 102 | 88 | 89 |
| 6 RPM | 15 | 45 | 47 | 39 | 25 | 30 |
| 3 RPM | 12 | 44 | 36 | 26 | 21 | 27 |
| PV, cPs | 41 | 43 | 35 | 35 | 36 | 39 |
| YP, lb/100 Sq. Ft. | 19 | 72 | 80 | 67 | 52 | 50 |
| SYNERESIS - inches | | | | | | |
| 1 DAY | 1/4 | <1/32 | <1/32 | <1/32 | 1/32 | 1/32 |
| 1 WEEK | 3/8 | 1/32 | 1/32 | 1/32 | 1/16 | 1/8 |

The above shows a broad range of effectiveness for inventive compositions using the two defined agent materials in a variety of ratios one to the other. The data also shows that a pregel provides improved syneresis control when activated at room temperature.

EXAMPLE 7

The example further demonstrates the use of a pregel preactivation. In this example a 2:1 mixture of castorwax (Thixcin R) and polyamide (Thixatrol NR22) was dispersed into a LVT 200 mineral Oil at a 25% loading. The biopolymer/oil suspension in LVT 200 was then passed one time through a high shear Manton Gaulin homogenizer at the temperatures shown. The shear-treated pregel was then incorporated at a temperature of 72°–74° F. into a base oil (MIO) containing HEC and compared against a dry powder mixture of the same two materials.

TABLE 7

| | Agent | | |
|---|---|---|---|
| | 2:1 Powder 50° C. | 2:1, Gel 60° C. | 2:1, Gel 70° C. |
| Percent | 1.5 | 6 | 6 |
| Fann Viscosity @77° F. | | | |
| 600 RPM | 101 | 133 | 137 |
| 300 RPM | 60 | 94 | 96 |

TABLE 7-continued

| | Agent | | |
|---|---|---|---|
| | 2:1 Powder 50° C. | 2:1, Gel 60° C. | 2:1, Gel 70° C. |
| 6 RPM | 15 | 34 | 35 |
| 3 RPM | 12 | 32 | 32 |
| PV, cPs | 41 | 39 | 41 |
| YP, lb/100 Sq. Ft. | 19 | 55 | 55 |
| SYNERESIS-inches | | | |
| 1 DAY | 1/4 | 1/8 | 1/32 |
| 1 WEEK | 3/8 | 1/4 | 1/8 |
| 1 MONTH | 1/2 | 5/16 | 3/8 |
| % Syneresis 1 Month | 12.8 | 7.1 | 7.8 |

The above results show the advantage of preactivation.

EXAMPLE 8

Discussion: This example shows that several polyamides in combination with THIXCIN R (THIX R) were found useful as materials in preparation of the biopolymer/oil suspension compositions of this invention. Crayvallac Super and THIXATROL PLUS, discussed previously, were used. Comparative tests showing the use of THIXATROL PLUS and Crayvallac Super by themselves are shown. Base oil was MIO and a HEC biopolymer was used.

TABLE 8

| Agent | THIX R/ THIXOTROL 2:1 | THIX R/ CRAYVALLAC SUPER | THIXATROL PLUS | CRAYVALLAC SUPER |
|---|---|---|---|---|
| Percent | 1.5 | 1.5 | 1.5 | 1.5 |
| Incorporation Temperature °F. | 115 | 113 | 112 | 114 |
| Base Oil | MIO | MIO | MIO | MIO |
| Fann Viscosity @ 77° F. | | | | |
| 600 RPM | 138 | 215 | 78 | 90 |
| 300 RPM | 103 | 173 | 42 | 56 |
| 6 RPM | 22 | 59 | 4 | 10 |
| 3 RPM | 15 | 39 | 3 | 8 |
| PV, cPs | | | | |
| YP, lb/100 Sq. Ft. | 35 | 42 | 36 | 34 |
| 10 Sec Gel, lb/100 Sq. Ft. | 68 | 131 | 6 | 22 |
| | 28 | 55 | 3 | 9 |

TABLE 8-continued

| Agent | THIX R/ THIXOTROL 2:1 | THIX R/ CRAYVALLAC SUPER | THIXATROL PLUS | CRAYVALLAC SUPER |
|---|---|---|---|---|
| SYNERESIS - inches | | | | |
| 1 DAY | 1/8 | 1/16 | 1/2 | 1/4 |
| 1 WEEK | 3/8 | 1/8 | 1/2 | 7/16 |
| 1 MONTH | 1/2 | 1/8 | 1/2 | 112 |
| % Syneresis 1 Month | 13.5 | 4.1 | 15.6 | 13.3 |
| COMMENTS | No Hard Pack | No Hard Pack | No Hard Pack | No Hard Pack |

We claim:

1. A liquid biopolymer/oil suspension composition for use in aqueous-based fluids used in the oil service industry comprising:
   a) one or more hydrocarbon oils,
   b) one or more biopolymers selected from the group consisting of cellulose ethers, starches, gums, vinyl polymers, acrylic polymers and biopolysaccharides, and
   c) an anti-settling agent comprising:
      i) one or more polyamides, and
      ii) hydrogenated castor oil.

2. The composition of claim 1 wherein the aqueous-based fluid is a completion fluid.

3. The composition of claim 1 wherein the hydrocarbon oil is selected from the group consisting of mineral seal oil, diesel oil, and mineral oil.

4. The composition of claim 1 where one or more of the biopolymers used are selected from the group consisting of hydroxyethylcellulose, carboxymethycellulose, quar gum, xanthan gum, polysaccharides and polyvinyl alcohol.

5. The composition of claim 1 wherein one or more of the polyamides of the anti-settling agent is essentially non-reactive.

6. The composition of claim 5 wherein the polyamide used comprises a polymide made by reacting at least one polycarboxylic acid of the formula (A)[COOH]$_x$ wherein x≧2 and A is selected from the group consisting of aliphatic, aromatic, cycloaliphatic and arylaliphatic groups with at least one monoamine of the formula (G)NH wherein G is selected from the group consisting of aliphatic, aromatic, cycloaliphatic and arylaliphatic groups, and wherein the monoamine may include primary amines and/or secondary amines, and when the monoamine contains a primary amine, the additional hydrogen atom is included in the (G) moiety, to form a polyamide of the formula (G)NOC(A)CON(G);

and the hydrogenated castor oil is castor wax.

7. The composition of claim 1 wherein the anti-settling agent comprises:
   a) one or more polyamides comprising from about 15% to about 80% of the agent, and
   b) hydrogenated castor oil comprising from about 20% to about 85% of the agent.

8. The compositon of claim 1 wherein the anti-settling agent was preactivated.

9. The composition of claim 1 where the hydrogenated castor oil is a castor wax of a hydroxyl value less than that of natural castor oil.

10. An aqueous-based fluid used in drilling operations containing the liquid biopolymer/oil suspension composition of claim 1.

11. A process for incorporating biopolymers into an aqueous-based completion fluid used in the oil service industry comprising preparing a liquid biopolymer/oil suspension composition comprising:
   a) one or more hydrocarbon oils,
   b) one or more biopolymers selected from the group consisting of cellulose ethers, starches, gums, vinyl polymers, acrylic polymers and biopolysaccharides, and
   c) an anti-settling agent comprising:
      i) one or more polyamides, and
      ii) hydrogenated castor oil;
   and dispersing such liquid biopolymer/oil suspension composition into said completion fluid.

12. The process of claim 11 wherein one or more of the biopolymers used are selected from the group consisting of hydroxyethylcellulose, carboxymethycellulose, quar gum, xanthan gum, polysaccharides and polyvinyl alcohol.

* * * * *